Patented Mar. 22, 1932

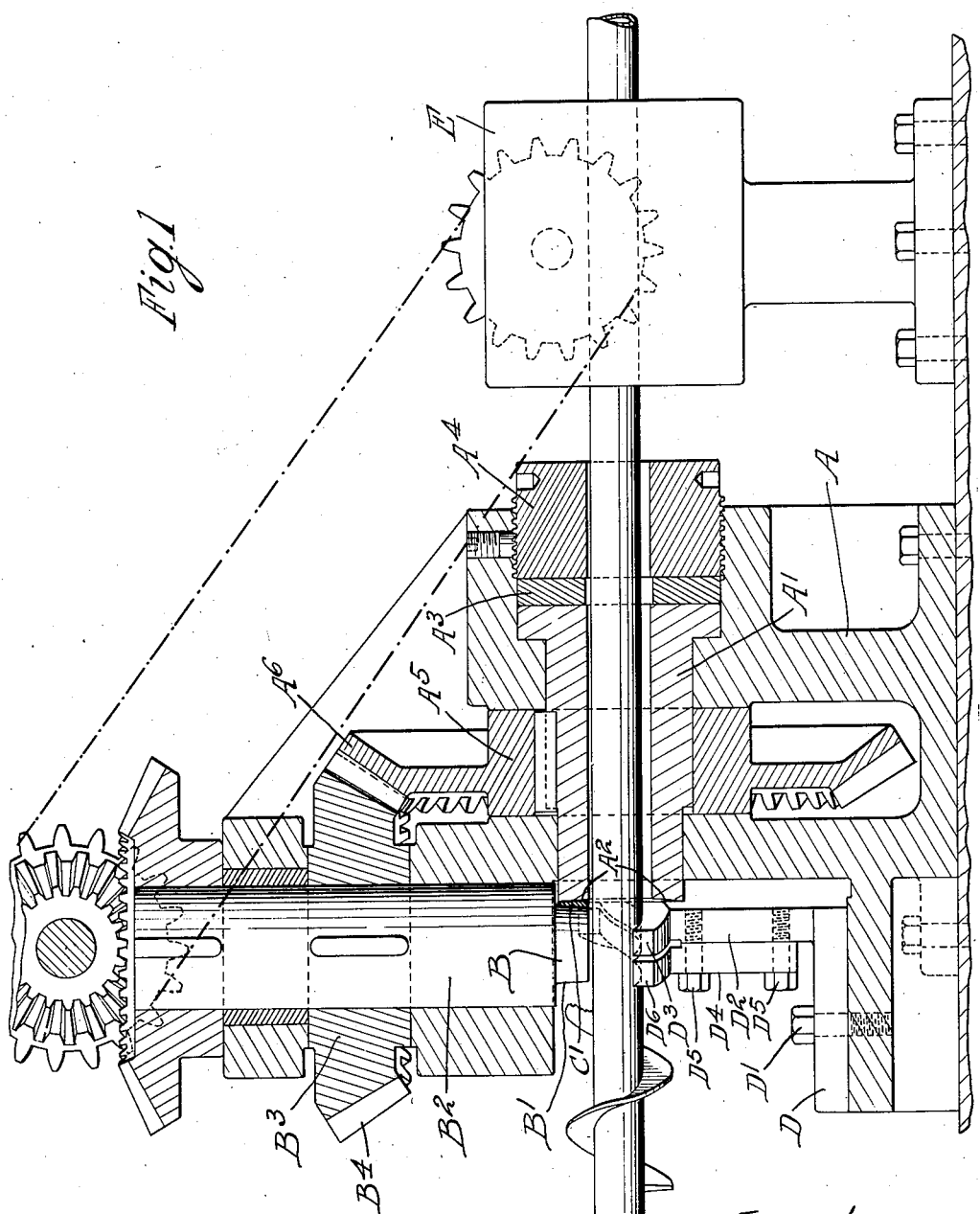

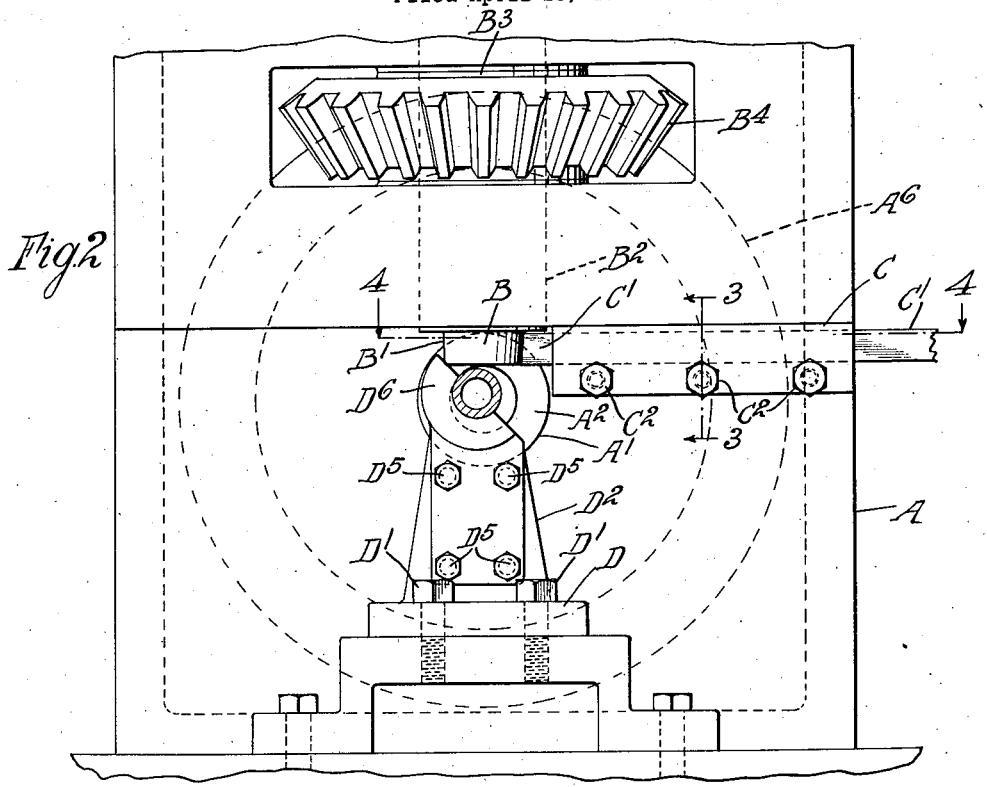
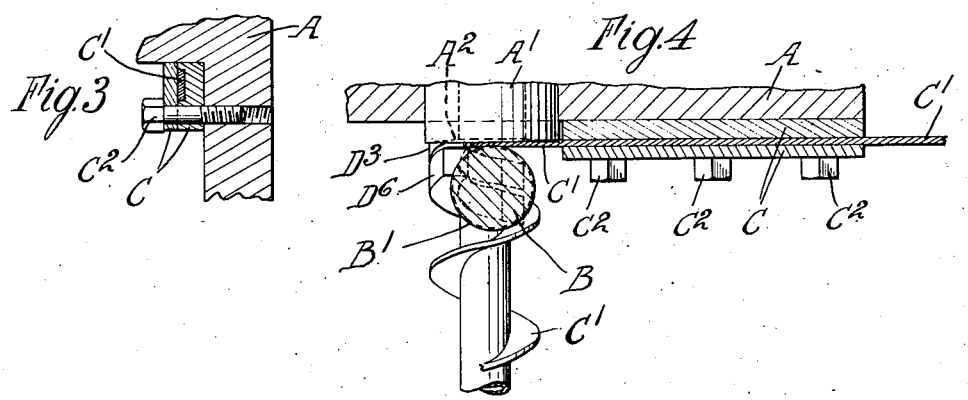

1,850,936

UNITED STATES PATENT OFFICE

JAMES L. LANE, OF CHICAGO, AND ALFRED H. MOORE, OF OAK PARK, ILLINOIS, ASSIGNORS TO LINK-BELT COMPANY, OF CHICAGO, ILLINOIS, A CORPORATION OF ILLINOIS

PROCESS OF MAKING SPIRAL CONVEYERS

Application filed April 13, 1928. Serial No. 269,714.

Our invention relates to improvements in processes of making spiral conveyers and has for one object to provide a new and improved process whereby the pipe or shaft about which the spiral flight is assembled in proper final working relation with the flight as the flight is formed. Another object is to provide a process wherein the flight is formed about the central shaft and wherein the shaft is fed forwardly and rotated in unison with the flight so that the flight may in a sense be formed by the central shaft and so that manipulation of the shaft and flight after the forming may be unnecessary. Other objects will appear from time to time throughout the specification and claims.

The invention is illustrated more or less diagrammatically in the accompanying drawings, wherein—

Figure 1 is a longitudinal vertical section through a machine adapted to carry out the invention;

Figure 2 is a front elevation of the machine;

Figure 3 is a section along the line 3—3 of Figure 2;

Figure 4 is a fragmentary section along the line 4—4 of Figure 2.

Like parts are indicated by like characters throughout the several figures.

A is a supporting frame. In it is mounted for rotation the hollow cylindrical roll $A^1$. This roll is supported at both ends in the frame as indicated and has at one end a cupped or concave working face $A^2$. $A^3$ is a thrust bearing. The frame A is associated with an adjustable thrust block $A^4$ to prevent longitudinal movement of the roll. $A^5$ is a hub mounted on the roll $A^1$ between its two bearings in the frame A and this hub carries a bevel gear $A^6$.

B is a generally cylindrical or very slightly tapered roll. Its axis of rotation is generally at right angles to the axis of rotation of the roll $A^1$ and its cylindrical working face $B^1$ is in opposition to the working face of the roll $A^1$, the end of the roll being substantially tangential to the inner diameter of the roll $A^1$. This roll B is located at the end of a drive shaft $B^2$ mounted for rotation in the frame A, being supported in bearings at both ends thereof. $B^3$ is a hub on the shaft $B^2$ between said bearings and it carries a bevel gear $B^4$ in mesh with the gear $A^6$. The shaft $B^2$ extends upwardly and may be driven by any suitable means not here shown, the driving of this shaft resulting in driving the rolls $A^1$ and B in unison.

Projecting laterally from the frame is a stock guide. This stock guide takes the form of a split or channeled pocket C through which a strip of bar stock $C^1$ may be fed and guided into the space between the opposed working faces of the rolls. This stock guide is removable, being held in place by the cap screws $C^2$ so that different or adjustable guides may be provided for the various sizes of bar stock required for the different sizes of conveyer flights. No feeding means are provided in connection with the stock guide. Once stock has been passed in through the guide and engaged the roll, the rolls themselves draw in the stock at the rate at which it is to be worked in the manner usual to rolling mill practice.

The flight guide comprises a base D bolted to the frame A by means of cap screws $D^1$. From it projects upwardly the bracket $D^2$ which carries a guide head $D^3$ located in front of the roll $A^1$. Associated with the bracket $D^2$ is a removable bracket $D^4$ which bracket is held on the member $D^2$ by the cap screws $D^5$. $D^6$ is a guide head on the member $D^4$ in opposition to the guide head $D^3$. These two guide heads cooperate to form a helical guide slot so positioned as to receive the flight after it has been passed between and been formed by the rolls and guide it along a helical path away from the rolls, giving it the desired pitch.

E is a shaft feeding and rotating mechanism located in line with the hollow cylindrical roll and adapted to feed the shaft longitudinally through the hollow roll to cause the rate of rotation and rate of longitudinal feed of the shaft to correspond to the rate of discharge and rotation of the finished flight. The details of this shaft feeding mechanism form no part of the present invention and I have therefore neither disclosed or described them.

In commercial practice spiral conveyers have their spiral flights mounted on pipe or shafts and they are so referred to in the trade. In this specification I refer only to shaft using that in its generic sense as applied to any element whether solid as a cold rolled shafting or hollow as a pipe which serves as a central supporting shaft about which spiral flights are wound.

The use and operation of this invention are as follows:

The shaft is fed in through the hollow roll until it normally extends beyond the working faces of the rolls. This may be done either by hand or by merely allowing the shaft feeding mechanism to operate. The shaft feeding mechanism may be independently driven or driven in unison with the rolls though if not independently driven it should be frictionally driven to permit slippage to enable the shaft feed and the flight feed to equalize. The operator then feeds a strip of stock and it may be bar stock in straight lengths or strip stock wound in rolls as the case may be. The end is fed in through the guide into engagement with the working face of the rolls. As the rolls rotate they draw the flat flight forming stock in between their working faces. It will be noted that the distance between the faces decreases outwardly so that the flight as it is formed is thicker toward the center than toward the outer periphery. This elongates the outer periphery of the flight and causes it to form a general spiral. The spiral flight thus formed is guided through the fixed guides to give it desired pitch. As this flight travels out through the guide it is wound about the shaft, the shaft being fed forward and rotated to conform to the travel or feed of the flight. When a flight of the desired length has been wound about a shaft, it is only necessary to cut off the stock, stop feed of the flight forming stock, run the shaft on through the machine and cut it off in proper length.

An arrangement such as this makes it possible to keep in stock only long lengths of shafting and of flight forming stock. The operator can run the machine until a flight of the right length has been formed, cut off the length of flight, withdraw the shaft and leave the apparatus in readiness for the next operation. It is not necessary then to feed out predetermined lengths of flights which must be cut in lengths to suit, with the stub ends wasted.

The relation between the forming rolls, the guide and the shaft feeding means are such that the flight is wound upon the shaft in the position which it is to occupy and no further manipulation or adjustment between the flight and the shaft is needed.

Since the conveyer flight with which we are concerned is a relatively massive heavy structure and since it is by cold drawing or rolling process formed as a spiral conveyer flight in a sense before it is wound upon the shaft by the cooperation of the two massive rollers, it will be evidence that if the shaft is of the proper size, the flight will grip it with great strength. This is essential as otherwise the flight will not maintain its grip on the shaft against the heavy loads which will be handled by the spiral conveyer. Once this flight grips the shaft, as long as the flight is continuously formed and fed out by the rollers, the feeding out of the flight will unless it slips on the shaft, result in positively feeding the shaft both longitudinally and rotationally as a result of the drive imparted by the rollers to the flight and hence obviously the positive feed E may be dispensed with. In fact, its main function is to prevent binding and reduces the load on the flight forming rollers and under ordinary conditions if this feed mechanism is dispensed with, the rollers will continue to form and feed out the flight rotating and translating the shaft as the flight is formed.

We claim:

1. The process of making spiral conveyers which comprises forming a conveyer flight from a flat strip of metal and as it is formed, rotating and feeding the formed flight about and along its longitudinal axis and winding it about a central shaft, and causing the flight to grip the shaft and to impart to it longitudinal and rotary movement at substantially the same speed as the movement of the flight.

2. The process of making spiral conveyers which comprises forming a conveyer flight from a flat cold strip of metal and as it is formed guiding and feeding the flight along a fixed helical path and as it is so guided and fed winding it about a central shaft, and causing the flight to grip the shaft and impart thereto longitudinal and rotary movement conforming to the helical path along which the flight is guided.

3. The process of making spiral conveyers which comprises forming a conveyer flight from a strip of metal and as it is formed, rotating and feeding the formed flight about and along its longitudinal axis and winding it about a central shaft, and causing the flight to grip the shaft and to impart to it longitudinal and rotary movement at substantially the same speed as the movement of the flight.

Signed at Chicago, in the county of Cook and State of Illinois, this 24th day of March, 1928.

JAMES L. LANE.
ALFRED H. MOORE.